United States Patent [19]

Giles, Jr.

[11] 4,455,410

[45] Jun. 19, 1984

[54] POLYETHERIMIDE-POLYSULFIDE BLENDS

[75] Inventor: Harold F. Giles, Jr., Cheshire, Mass.

[73] Assignee: General Electric Company, Pittsfield, Mass.

[21] Appl. No.: 359,257

[22] Filed: Mar. 18, 1982

[51] Int. Cl.³ .............................................. C08G 69/48
[52] U.S. Cl. ..................................... 525/436; 525/537
[58] Field of Search ................................. 525/436, 537

[56] References Cited

U.S. PATENT DOCUMENTS

| | | | |
|---|---|---|---|
| 3,658,938 | 4/1972 | Kwiatkowski | 525/436 |
| 4,017,555 | 4/1977 | Alvarez | 525/537 |
| 4,258,155 | 3/1981 | Halub | 525/436 |
| 4,293,670 | 10/1981 | Robeson | 525/436 |
| 4,340,697 | 7/1982 | Ayo | 525/537 |

Primary Examiner—Melvyn I. Marquis
Attorney, Agent, or Firm—Bernard, Rothwell & Brown

[57] ABSTRACT

Disclosed are blends of (a) a polyetherimide and (b) a polysulfide. The blends have good flexural strength regardless of the relative proportions of the components of the blend and have generally higher mechanical properties than those associated with the polysulfide component of the blend.

8 Claims, No Drawings

POLYETHERIMIDE-POLYSULFIDE BLENDS

This invention relates to a class of polyetherimide-polysulfide blends. The blends have good flexural strength regardless of the relative proportions of the components of the blend and have generally higher mechanical properties than those associated with the polysulfide component of the blends.

The blends of the invention include a polyetherimide of the formula:

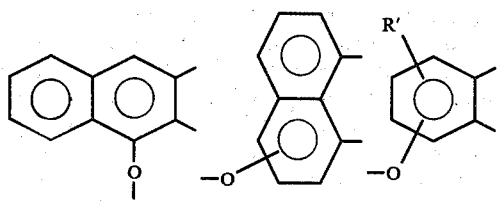

where a represents a whole number in excess of 1, e.g., 10 to 10,000 or more, the group

is selected from:

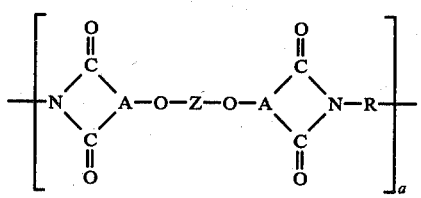

R' being hydrogen, lower alkyl or lower alkoxy, preferably a polyetherimide including the latter

group where R' is hydrogen such that the polyetherimide is of the formula:

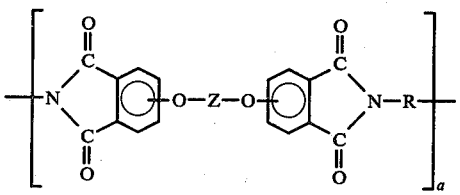

and the divalent bonds of the —O—Z—O— radical are in the 3,3'; 3,4'; 4,3' or the 4,4' position;
Z is a member of the class consisting of (1)

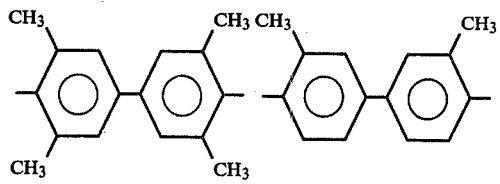

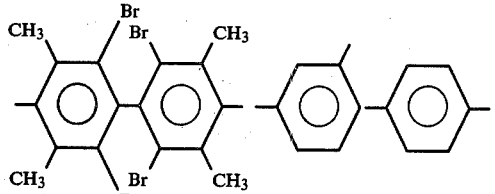

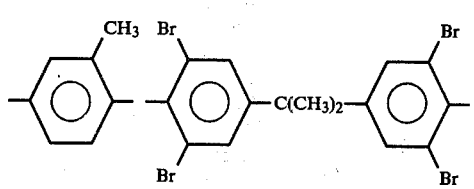

and (2) divalent organic radicals of the general formula:

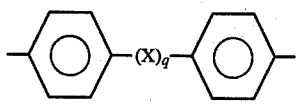

where X is a member selected from the class consisting of divalent radicals of the formulas,

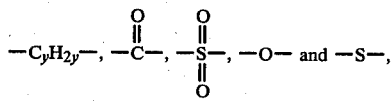

where q is 0 or 1, y is a whole number from 1 to 5, and R is a divalent organic radical selected from the class consisting of (1) aromatic hydrocarbon radicals having from 6–20 carbon atoms and halogenated derivatives thereof, (2) alkylene radicals and cycloalkylene radicals having from 2–20 carbon atoms, $C_{(2-8)}$ alkylene terminated polydiorganosiloxane, and (3) divalent radicals included by the formula

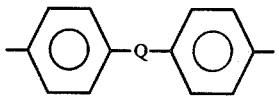

where Q is a member selected from the class consisting of

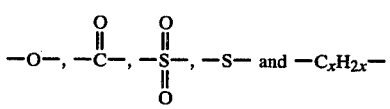

where x is a whole number from 1 to 5 inclusive. Particularly preferred polyetherimides for the purposes of the present invention include those where

and Z respectively are:

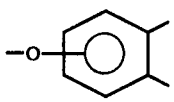 and 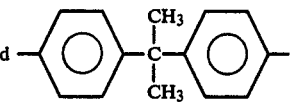

and R is selected from:

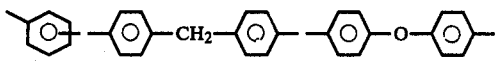

The polyetherimides where R is metaphenylene are most preferred.

The polyetherimide-polysulfide blends of the invention also include a polysulfide which is a polymer composed substantially of linear molecules of moderate molecular weight having repeating units of the structural formula:

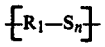

where $R_1$ is a divalent aliphatic or aromatic radical and n is a number from 1 to 5, generally about one. Preferably, $R_1$ is aromatic such as phenylene, biphenylene, naphthylene, oxydiphenyl or lower alkyl, lower alkoxy or halogen substituted derivatives thereof, the lower alkyl substituents having one to six carbon atoms such as methyl, propyl, isobutyl, n-hexyl and the like and n is one. Generally, the aromatic polysulfide polymer will have an inherent viscosity within the range of about 0.05 to about 0.4, preferably about 0.1 to about 0.35, determined at 206° C. in 1-chloronaphthalene at a polymer concentration of 0.4 g/100 ml solution.

A particularly preferred polysulfide is a polyphenylene sulfide such as that sold under the tradename Ryton by Phillips Petroleum Company, Bartlesville, Okla. and having repeating units of the structural formula:

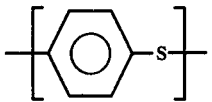

Such polyphenylene sulfides have high melting points, outstanding chemical resistance, thermal stability and non-flammability. The polymer is characterized by high stiffness and good retention of mechnical properties at elevated temperature.

The polyetherimides can be obtained by any of the methods well known to those skilled in the art including the reaction of any aromatic bis(ether anhydrides) of the formula

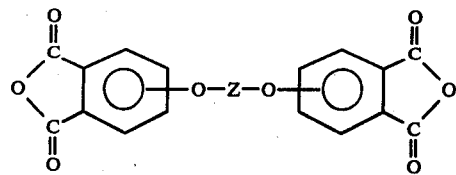

where Z is as defined hereinbefore with an organic diamine of the formula

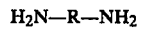

where R is as defined hereinbefore.

Aromatic bis(ether anyhdride)s of the above formula include, for example, 2,2-bis[4-(2,3-dicarboxyphenoxy)-phenyl]-propane dianhydride; 4,4'-bis(2,3-dicarboxyphenoxy)diphenyl ether dianhydride; 1,3-bis(2,3-dicarboxyphenoxy)benzene dianhydride; 4,4'-bis(2,3-dicarboxyphenoxy)diphenyl sulfide dianhydride; 1,4-bis(2,3-dicarboxyphenoxy)benzene dianhydride; 4,4'-bis(2,3-dicarboxyphenoxy)benzophenone dianhydride; 4,4'-bis(2,3-dicarboxyphenoxy)diphenyl sulfone dianhydride; 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)-diphenyl sulfide dianhydride; 1,3-bis(3,4-dicarboxyphenoxy)benezene dianhydride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)-4'-(3,4-dicarboxyphenoxy)diphenyl-2,2-propane dianhydride; etc. and mixtures of such dianhydrides.

In addition, aromatic bis(ether anhydride)s also included by the above formula are shown by Koton, M. M.; Florinski, F. S.; Bessonov, M. I.; Rudakov, A. P. (Institute of Heteroorganic compounds, Academy of Sciences, U.S.S.R.), U.S.S.R. 257,010, Nov. 11, 1969, Appl. May 3, 1967. In addition, dianhydrides are shown by M. M. Koton, F. S. Florinski, Zh Org. Khin, 4(5), 774 (1968).

Organic diamines of the above formula include, for example, m-phenylenediamine, p-phenylenediamine, 4,4'-diaminodiphenylpropane, 4,4'-diaminodiphenylmethane, benzidine, 4,4'-diaminodiphenyl sulfide, 4,4'-diaminodiphenyl sulfone, 4,4'-diaminodiphyenyl ether, 1,5-diaminonaphthalene, 3,3'-dimenthylbenzidine, 3,3'-dimethoxybenzidine, 2,4-bis(β-amino-t-butyl)toluene, bis(p-β-amino-t-butylphenyl)ether, bis(p-β-methyl-o-aminopentyl)benzene, 1,3-diamino-4-isopropylbenzene, 1,2-bis(3-aminopropoxy)ethane, m-xylylenediamine, p-xylylenediamine, 2,4-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylopropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylendediamine, 1,4-cyclohexanediamine, 1,12-octadecanediamine, bis(3-aminopropyl)sulfide, N-methyl-bis(3-aminopropyl)amine, hexamethylenediame, heptamethylenediamine, nonamethylenediamine, decamethylenediamine, bis(3-aminopropyl) tetramethyldisiloxane, bis(4-aminobutyl) tetramethyldisiloxane, and the like.

In general, the reactions can be advantageously carried out employing well-known solvents, e.g., o-dichlorobenzene, m-cresol/toluene, etc. in which to effect interaction between the dianhydrides and the diamines, at temperatures of from about 100° to about 250° C. Alternatively, the polyetherimides can be prepared by melt polymerization of any of the above dianhydrides with any of the above diamine compounds while heating the mixture of the ingredients at elevated temperatures with concurrent intermixing. Generally, melt polymerization temperatures between about 200° to 400° C. and preferably 230° to 300° C. can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal amine groups. Generally, useful polyetherimides have an intrinsic viscosity $[\eta]$ greater than 0.2 deciliters per gram, preferably 0.35 to 0.60, or 0.7 deciliters per gram or even higher when measured in m-creasol at 25° C.

Included among the many methods of making the polysulfides are those disclosed in U.S. Pat. Nos. 3,354,129 and 2,513,188, in British Pat. No. 962,941 and in the Kirk-Othmer Encyclopedia of Chemical Technology, Vol. 16, pp. 253–272, John Wiley & Sons (1968). These disclosures are incorporated herein in their entirety by reference for the purpose of teaching, by way of illustration, general and specific methods for preparing polysulfides suitable for the blends of this invention.

As is described in U.S. Pat. No. 3,354,129, aromatic polysulfides can be prepared by contacting a polyhalo-substituted cyclic compound containing unsaturation between adjacent ring atoms and an alkali metal sulfide in the presence of a polar organic compound. The resulting polymer contains the cyclic structure of the polyhalo-substituted compound coupled in repeating units through a sulfur atom. Aromatic polysulfides can also be manufactured as described in U.S. Pat. No. 2,513,188 by reacting mixtures of p-dichlorobenzene and 1,2,4-trichlorobenzene with sulfur and metal sulfide at fusion temperatures. The polymers can also be manufactured by the method described in British Pat. No. 962,941 wherein metal salts of halothiophenols are heated at a polymerizing temperature.

According to U.S. Pat. No. 3,843,614, aliphatic polysulfide polymers can be made by reacting sodium polysulfide with a reactive halide such as ethylene dichloride. Further methods are set forth in the Kirk-Othmer Encyclopedia of Chemical Technology previously mentioned in the articles cited therein.

In accordance with the present invention, blends of a polyetherimide and a polysulfide are generally obtainable in all proportions of the two polymers relative to each other. Consequently, blends comprising from about 1 to about 99%, by weight, polyetherimide and from about 99 to about 1%, by weight polysulfide are included within the scope of the invention. By controlling the proportions of the polyetherimide and polysulfide relative to each other, blends having certain predetermined properties which are improved over those of polysulfide component may be alone readily obtained. In general, blends of polyetherimides and polysulfides have a good appearance with a dark opaque surface, a relatively high flexural strength regardless of the blend composition and adequate physical properties, particularly at a relatively low amounts of polysulfide relative to the polyetherimide. In addition, the polysulfide component of the blends facilitates the inclusion of fillers or reinforcements such as glass as well as other polymeric materials.

It is contemplated that the polyetherimide-polysulfide blends of the present invention may also include additive materials such as fillers, stabilizers, plasticizers, flexibilizers, surfactant agents, pigments, dyes, reinforcements, flame retardants and diluents in conventional amounts. It is also contemplated that the blends of the invention may include two or more polyetherimides with one or more polysulfides or two or more polysulfides in combination with one or more polyetherimides.

Methods for forming polyetherimide-polysulfide blends may vary considerably. Prior art blending techniques are generally satisfactory. A preferred method comprises blending the polymers and additives such as reinforcements in powder, granular or filamentous form, extruding the blend, and chopping the extrudate into pellets suitable for molding by means conventionally used to mold normally solid thermoplastic compositions.

The polyetherimide-polysulfide blends of the present invention have application in a wide variety of physical shapes and forms, including the use as films, molding compounds, coatings, etc. When used as films or when made into molded products, these blends, including laminated products prepared therefrom, not only possess good physical properties at room temperature but they retain their strength and excellent response to workloading at elevated temperatures for long periods of time. Films formed from the blends of this invention may be used in application where films have been used previously. Thus, the blends of the recent invention can be used in automobile and aviation applications for decorative and protective purposes, and as high temperature electrical insulation for motor slot liners, transformers, dielectric capacitors, coil and cable wrappings (form wound coil insulation for motors), and for containers and container linings. The blends can also be used in laminated structures where films or solutions of the blend are applied to various heat-resistant or other type of materials such as asbestos, mica, glass fiber and the like, the sheets superimposed one upon the other, and thereafter subjecting the sheets to elevated temperatures and pressures to effect flow and cure of the resinous binder to yield cohesive laminated structures. Films made from the subject polyetherimide-polysulfide blends can also serve in printed circuit applications.

Alternatively, solutions of the blends herein described can be coated on electrical conductors such as copper, aluminum, etc. and thereafter the coating conductor can be heated at elevated temperature to remove the solvent and provide a continuous resinous composition thereon. If desired, an additional overcoat may be applied to such insulated conductors including the use of polymeric coatings, such as polyamides, polyesters, silicones, polyvinylformal resins, epoxy resins, polyimides, polytetrafluoroethylene, etc. The use of the blends of the present invention as overcoats on other types of insulation is not precluded.

Other applications which are contemplated for these blends include their use as binders for asbestos fibers, carbon fibers, and other fibrous materials in making brake linings. In addition, molding compositions and molded articles may be formed from the polymeric blends of the invention by incorporating such fillers as asbestos, glass fibers, talc, quartz, powder, finely divided carbon, silica and the like into the blends prior to molding. Shaped articles may be formed under heat, or under heat and pressure, in accordance with practices well-known in the art.

The following examples illustrate specific polyetherimide-polysulfide blends in accordance with the present invention. It should be understood that the examples are given for the purpose of illustration and do not limit the invention. In the examples, all parts and percentages are by weight unless otherwise specified.

EXAMPLE I

A polyetherimide-polysulfide blend according to the invention was prepared, molded into test specimens and then tested for various physical properties.

The polyetherimide was prepared from the reaction product of essentially equimolar amounts of 2,2-bis[4-(3,4-dicarboxy phenoxy)phenyl]propane dianhydride and m-phenylene diamine produced at elevated temperature of about 250° to about 300° C. and under nitrogen atmosphere. The polymer was extruded at about 300° C. to form a strand and mechanically chopped into pellets. A test specimen injection molded from the pellets was tested for physical properties and the results are set forth in the following Table.

About 90 parts of the above polyetherimide were mixed with about 10 parts of polyphenylene sulfide resin powder sold commercially under the trade name Ryton P-4 by Phillips Chemical Company. The polymer mixture was then extruded in a 28 mm. twin screw Werner & Pfleiderer extruder having a temperature profile varying from about 310° to 327° C. The resulting extrudate was comminuted into pellets and the pellets injection molded at about 329° C. into test specimens. Impact strengths of these specimens were measured according to the notched and unnotched Izod test and the results are set forth in the Table. The heat deflection temperature, flexural strength, flexural modulus, and tensile properties of the blend were also measured and are given in the Table.

EXAMPLE II

The procedure of Example I was repeated with the exception that about 70 parts of the polyetherimide were blended with about 30 parts of polysulfide to produce the blend according to the invention. The results of the notched and unnotched Izod impact test, as well as the heat deflection temperature, flexural strength, flexural modulus and tensile properties for the blend are detailed in the Table.

EXAMPLE III

The procedure of Example I was repeated with the exception that about 50 parts of the polyetherimide were blended with about 50 parts of polysulfide to produce the blend according to the invention. The results of the notched and unnotched Izod impact test, as well as the heat distortion temperature, flexural strength, flexural modulus and tensile properties for the blend are detailed in the Table.

EXAMPLE IV

The procedure of Example I was repeated with the exception that about 30 parts of the polyetherimide were blended with about 70 parts of polysulfide to produce the blend according to the invention. The results of the notched and unnotched Izod impact test, as well as the heat deflection temperature, flexural strength, flexural modulus and tensile properties for the blend are detailed in the Table.

EXAMPLE V

The procedure of Example I was repeated with the exception that about 10 parts of the polyetherimide were blended with about 90 parts of polysulfide to produce the blend according to the invention. In addition, the molding temperature was about 288° C. The results of the notched and unnotched Izod impact test, as well as the heat deflection temperature, flexural strength, flexural modulus and tensile properties for the blend are detailed in the Table.

TABLE I

| Example | % Polyetherimide | % Polysulfide | Izod Impact, 3.2 mm bar (ft lbs/in)[1] | | HDT °C. @ 1.82 MPa[2] | Flexural Properties[3] | | | Tensile Properties[4] | | | |
|---|---|---|---|---|---|---|---|---|---|---|---|---|
| | | | Notched | Unnotched | | Initial Modulus (PSI × $10^5$) | Strength @ 6.2 mm Defl. (PSI × $10^4$) | Ultimate Strength (PSI × $10^4$) | Yield % | (PSI × $10^4$) | Failure % | (PSI × $10^4$) |
| I | 100 | 0 | 1.1 | 26.5 | 186 | 5.02 | 2.10 | 2.51 | 17.6 | 1.50 | 36 | 1.23 |
|  | 90 | 10 | 0.7 | 20.4 | 158 | 4.79 | 1.99 | 2.22 | 22 | 1.45 | 35 | 1.16 |
| II | 70 | 30 | 0.4 | 14.4 | 118 | 5.15 | 2.01 | 2.21 | — | — | 8 | 1.03 |
| III | 50 | 50 | 0.3 | 14.6 5.4 | 98 | 4.79 | 1.89 | 2.01 | — | — | 8 | 1.09 |
| IV | 30 | 70 | 0.2 | 4.4 | 91 | 5.59 | — | 1.57 | — | — | 5 | 0.80 |
| V | 10 | 90 | 0.2 | 2.5 | 89 | 4.88 | — | 0.710 | — | — | 4 | 0.710 |

[1]Tested according to ASTM method D-256. Unnotched bars contain notch on back side.
[2]Tested according to ASTM method D-648 using a 3.2 mm bar.
[3]Tested according to ASTM method D-790 using a 3.2 mm bar at a 1.27 mm/min crosshead speed.
[4]Tested according to ASTM method D-638 using a Type I bar with a 5.08 mm/min crosshead speed.

From the above results, it is apparent in terms of the blending range profile that the notched Izod impact strength values decrease fairly rapidly as more polysulfide is included up to about at 50:50 blend ratio of the two components. Beyond the 50:50 blend ratio, in terms of increasing polysulfide content, the values for the notched Izod decrease very gradually. These data along with the unnotched data indicate a phase inversion at about a 50:50 blend composition.

The change in heat deflection temperature values with the change in composition for the blends also indicates that a phase inversion ocurrs around 50:50 blend level. While the published heat deflection value for the polysulfide used is in excess of 260° C., interestingly at a blend composition containing a major proportion of polysulfide, the heat deflection temperature for the blend is significantly lower than that for the polysulfide component alone. For example, the blend of about 90% polysulfide has a heat deflection temperature much lower at about 89° C. than the published value for the polysulfide material. This difference may be attributed to the 40% glass contained in the pure Ryton R-4 polysulfide which stiffens the crystalline resin matrix significantly.

From an examination of the flexural properties of the blends over the range of compositions, it is apparent that the flexural modulus remains relatively constant regardless of the blend compositions and the flexural strength of the blends, although lower than that of the polyetherimide component, gradually decreases with increasing content of polysulfide up to the 50:50 blend ratio where the flexural strength deceases rapidly, again probably due to a phase inversion at a 50:50 blend ratio. Tensile strength and elongation for the blends are generally better with a major proportion of polyetherimide component.

From the above, it may be concluded that the blends of the invention, particularly those having a minor proportion of polysulfide, e.g., about 10% polysulfide, have comparable physical properties to that of the polyetherimide component with the exception of the heat deflection temperature. Thus, the polysulfide component of the blends could be used as a compatibilizing agent when forming blends of three or more components. In addition, in view of the physical properties of polysulfides, blends containing a minor proportion, polysulfide, e.g., from about 10 to 40% polysulfide, may have excellent properties in terms of heat deflection temperature, tensile and flexural properties.

Substitution and other polyetherimides and/or other polysulfides for the polyetherimide and/or polysulfides of the blends of the above examples may result in the formulation of polyetherimide-polysulfide polymer blends having similar characteristics.

While the present invention has been described with reference to particular embodiments thereof, it will be understood that numerous modifications may be made by those skilled in the art without actually departing from the spirit and scope of the invention as defined in the appended claims.

We claim:

1. A composition comprising a blend of (a) a polysulfide of the following formula:

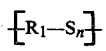

where $R_1$ is a divalent aliphatic or aromatic radical and n is a whole number from 1 to 5; and (b) a polyetherimide of the following formula:

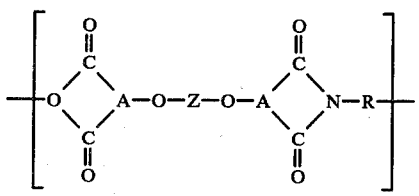

where a represents a whole number in excess of 1, the group

is selected from:

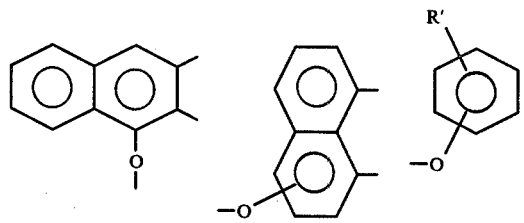

R' being hydrogen, lower alkyl or lower alkoxy, Z is a member of the class consisting of (1):

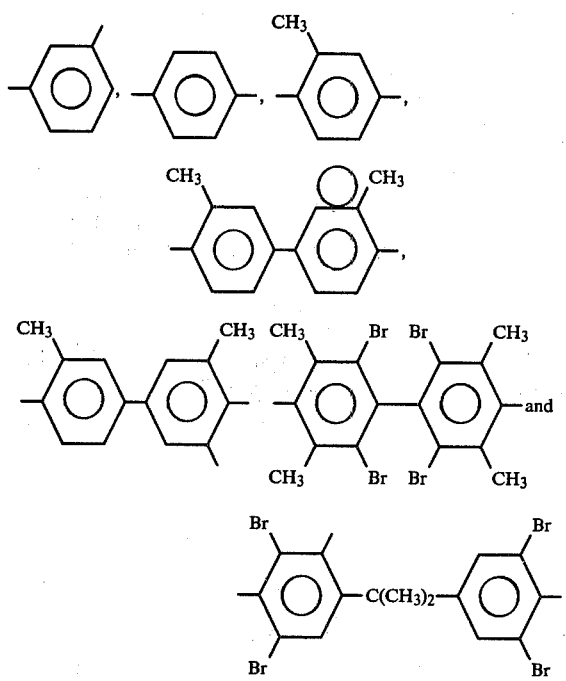

and (2) divalent organic radicals of the general formula:

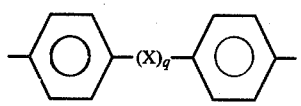

where X is a member selected from the class consisting of divalent radicals of the formulas:

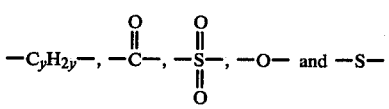

where q is 0 or 1, y is a whole number from 1 to 5, and R is a divalent organic radical selected from the class consisting of (1) aromatic hydrocarbon radicals having from 6-10 carbon atoms and halogenated derivatives thereof, (2) alkylene radicals and cycloalkylene radicals having from 2-20 carbon atoms C(2-8) alkylene terminated polydiorganosiloxane, and (3) divalent radicals included by the formula:

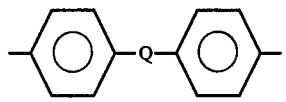

where Q is a member selected from the class consisting of:

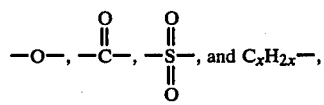

where x is a whole number from 1 to 5 inclusive.

2. A composition in accordance with claim 1 wherein the polysulfide has repeating units of the structural formula:

$$-R_1-S_n-$$

where $R_1$ is a divalent aliphatic or aromatic radical and n is a number from 1 to 5.

3. A composition in accordance with claim 2 wherein $R_1$ of the polysulfide is aromatic and selected from phenylene, biphenylene, naphthylene, oxydiphenyl or lower alkyl, lower alkoxy or halogen substituted derivatives thereof, and n is one.

4. A composition in accordance with claim 1 wherein the polysulfide is polyphenylene sulfide.

5. A composition in accordance with claims 2, 3, 4 or 1 wherein the polyetherimide has the formula:

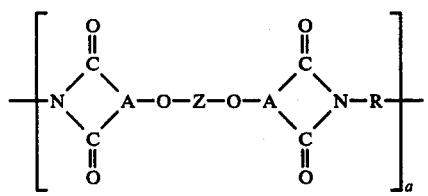

where a represents a whole number in excess of 1, the group

is selected from:

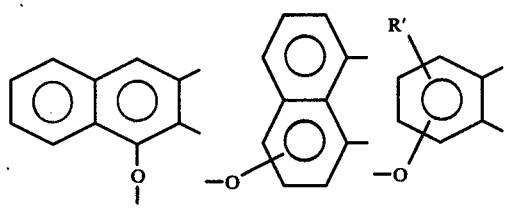

R' being hydrogen, lower alkyl or alkoxy, Z is a member of the class consisting of (1)

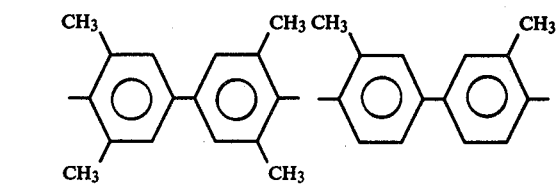

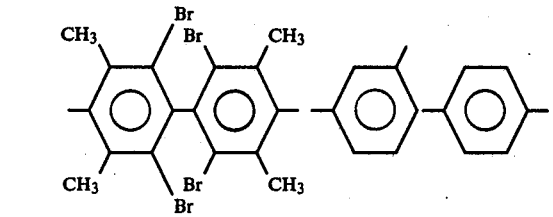

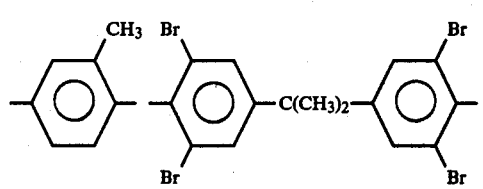

and (2) divalent organic radicals of the general formula:

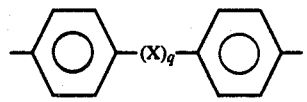

where X is a member selected from the class consisting of divalent radicals of the formulas,

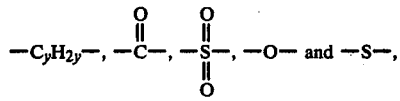

where q is 0 or 1, y is a whole number from 1 to 5, and R is a divalent organic radical selected from the class consisting of (1) aromatic hydrocarbon radicals having from 6-10 carbon atoms and halogenated derivatives thereof, (2) alkylene radicals and cycloalkylene radicals having from 2-20 carbon atoms, $C_{(2-8)}$ alkylene terminated polydiorganosiloxane, and (3) divalent radicals included by the formula

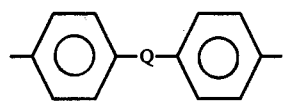

where Q is a member selected from the class consisting of

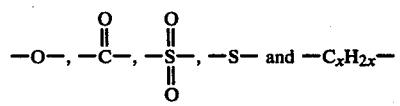

where x is a whole number from 1 to 5 inclusive.

6. A composition in accordance with claim 5 wherein the polyetherimide is of the formula:

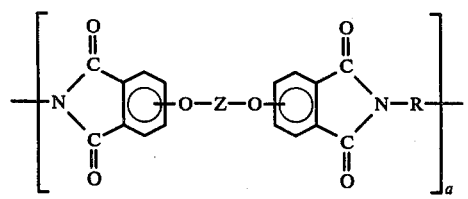
and the divalent bonds of the —O—Z—O—radical are in the 3,3'; 3,4'; 4,3' or the 4,4' position.
7. A composition in accordance with claim 6 wherein Z is;
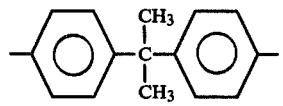
and R is selected from;
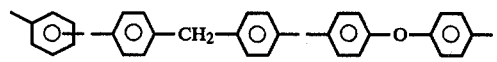
8. A composition in accordance with claim 7 wherein the polyetherimide is of the formula:
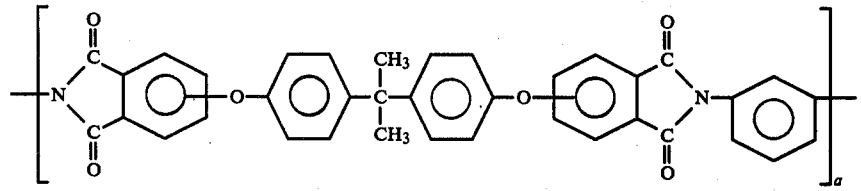
* * * * *

UNITED STATES PATENT AND TRADEMARK OFFICE
CERTIFICATE OF CORRECTION

PATENT NO. : 4,455,410

DATED : June 19, 1984

INVENTOR(S) : Giles

It is certified that error appears in the above-identified patent and that said Letters Patent is hereby corrected as shown below:

Claim 1, col. 10, lines 9-17,

" 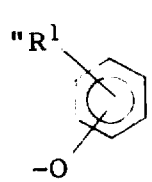 "   should be  -- 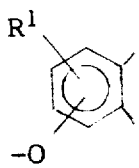 --

Claim 1, col. 10, lines 28-33,

" 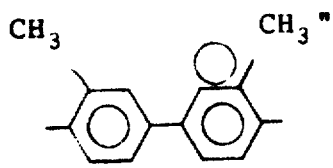 "

should be -- 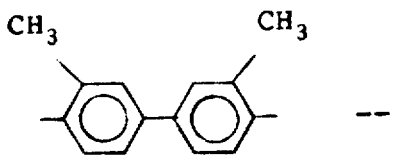 --

UNITED STATES PATENT AND TRADEMARK OFFICE
CERTIFICATE OF CORRECTION

PATENT NO. : 4,455,410
DATED : June 19, 1984
INVENTOR(S) : Giles

It is certified that error appears in the above-identified patent and that said Letters Patent is hereby corrected as shown below:

Claim 1  column 10, lines 33-39,

"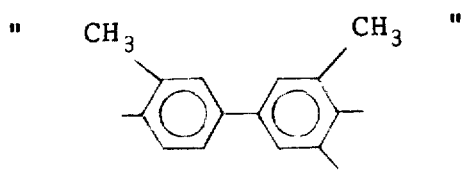"

should be -- 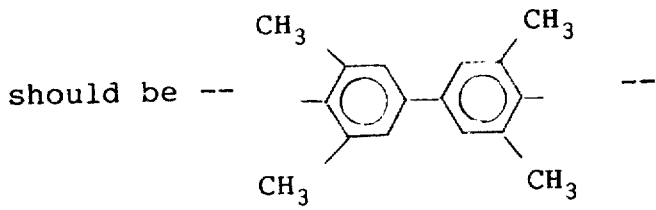 --

UNITED STATES PATENT AND TRADEMARK OFFICE
CERTIFICATE OF CORRECTION

PATENT NO. : 4,455,410

DATED : June 19, 1984

INVENTOR(S) : Giles

It is certified that error appears in the above-identified patent and that said Letters Patent is hereby corrected as shown below:

col. 10, lines 41-48,

" 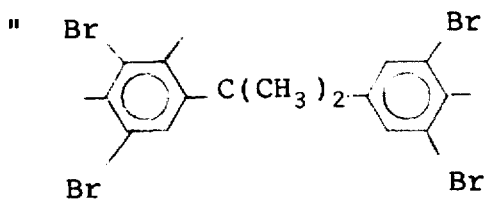

should be -- 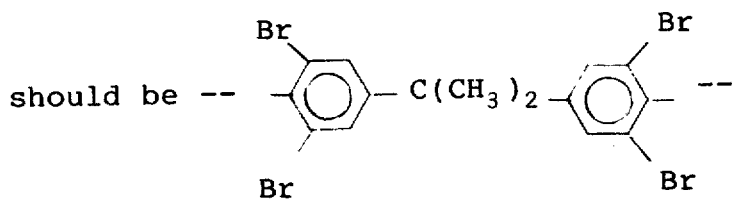 --

Signed and Sealed this

Eleventh Day of December 1984

[SEAL]

Attest:

GERALD J. MOSSINGHOFF

Attesting Officer  Commissioner of Patents and Trademarks